（12） United States Patent
Carey et al.

(10) Patent No.: US 8,233,247 B2
(45) Date of Patent: Jul. 31, 2012

(54) SCISSORING-TYPE CURRENT-PERPENDICULAR-TO-THE-PLANE GIANT MAGNETORESISTANCE (CPP-GMR) SENSORS WITH DAMPED FREE LAYER STRUCTURES

(75) Inventors: Matthew J. Carey, San Jose, CA (US); Jeffrey R. Childress, San Jose, CA (US); Stefan Maat, San Jose, CA (US); Neil Smith, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 854 days.

(21) Appl. No.: 12/101,453

(22) Filed: Apr. 11, 2008

(65) Prior Publication Data

US 2009/0257154 A1    Oct. 15, 2009

(51) Int. Cl.
G11B 5/33    (2006.01)
(52) U.S. Cl. ........................................................ 360/324
(58) Field of Classification Search .................. None
See application file for complete search history.

(56) References Cited

U.S. PATENT DOCUMENTS

| | | | |
|---|---|---|---|
| 5,576,914 | A | 11/1996 | Rottmayer et al. |
| 5,905,611 | A | 5/1999 | Yoda et al. |
| 7,035,062 | B1 | 4/2006 | Mao et al. |
| 7,126,797 | B2 | 10/2006 | Hasegawa et al. |
| 7,821,748 | B2 * | 10/2010 | Fukuzawa et al. ......... 360/324.2 |
| 2005/0041342 | A1 * | 2/2005 | Huai et al. ................ 360/324.12 |
| 2006/0002032 | A1 * | 1/2006 | Li et al. ......................... 360/315 |
| 2006/0218775 | A1 | 10/2006 | Carey et al. |
| 2006/0221512 | A1 | 10/2006 | Gill et al. |
| 2006/0221515 | A1 | 10/2006 | Carey et al. |
| 2007/0002503 | A1 | 1/2007 | Sbiaa et al. |
| 2007/0035894 | A1 | 2/2007 | Freitag et al. |
| 2007/0086121 | A1 * | 4/2007 | Nagase et al. ............. 360/324.1 |

(Continued)

FOREIGN PATENT DOCUMENTS

JP    2001352112    12/2001

(Continued)

OTHER PUBLICATIONS

Seigler, et al., "Current-perpendicular-to-plane multilayer sensors for magnetic recording", IEEE Transactions on Magnetics, vol. 39(3), May 2003, pp. 1855-1858.

(Continued)

*Primary Examiner* — David D Davis
(74) *Attorney, Agent, or Firm* — Thomas R. Berthold

(57) ABSTRACT

A "scissoring-type" current-perpendicular-to-the-plane giant magnetoresistive (CPP-GMR) sensor has magnetically damped free layers. In one embodiment each of the two free layers is in contact with a damping layer that comprises Pt or Pd, or a lanthanoid (an element selected from the group consisting of La, Ce, Pr, Nd, Pm, Sm, Eu, Gd, Tb, Dy, Ho, Er, Th, Yb, and Lu). Each of the two free layers has one of its surfaces in contact with the sensor's electrically conducting nonmagnetic spacer layer and its other surface in contact with its associated damping layer. A nonmagnetic film may be located between each free layer and its associated damping layer. In another embodiment the damping element is present as a dopant or impurity in each of the two free layers. In another embodiment a nanolayer of the damping element is located within each of the two free layers.

14 Claims, 6 Drawing Sheets

U.S. PATENT DOCUMENTS

2009/0154025 A1* 6/2009 Carey et al. .................. 360/314

FOREIGN PATENT DOCUMENTS

JP  2006237154  9/2006

OTHER PUBLICATIONS

Meng et al., "Spin transfer in nanomagnetic devices with perpendicular anisotropy", Applied Physics Letters 88, 172506 (2006).

Tanaka et al., "Spin-valve heads in the current-perpendicular-to-plane mode for ultrahigh-density recording", IEEE Transactions on Magnetics, vol. 38 (1): 84-88 Part 1, Jan. 2002.

Zhu et al., "Spin transfer induced noise in CPP read heads," IEEE Transactions on Magnetics, vol. 40, Jan. 2004, pp. 182-188.

Tserkovnyak et al., "Enhanced Gilbert Damping in Thin Ferromagnetic Films", Phys Rev Lett, vol. 88, No. 11, Mar. 18, 2002, 117601.

Reidy et al., "Dopants for independent control of precessional frequency and damping in Ni81Fe19 (50 nm) thin films", Appl. Phys. Lett., vol. 82, No. 8, Feb. 24, 2003, pp. 1254-1256.

Bailey et al., "Control of Magnetization Dynamics in Ni81Fe19 Thin Films Through the Use of Rare-Earth Dopants", IEEE Transactions on Magnetics, vol. 37, No. 4, Jul. 2001, pp. 1749-1754.

* cited by examiner

SCISSORING-TYPE CURRENT-PERPENDICULAR-TO-THE-PLANE GIANT MAGNETORESISTANCE (CPP-GMR) SENSORS WITH DAMPED FREE LAYER STRUCTURES

BACKGROUND OF THE INVENTION

1. Field of the Invention

The invention relates generally to a current-perpendicular-to-the-plane (CPP) sensor based on the giant magnetoresistance (GMR) effect that operates with the sense current directed perpendicularly to the planes of the layers making up the sensor stack, and more particularly to a scissoring-type CPP-GMR sensor with dual sensing or free layers.

2. Background of the Invention

One type of conventional magnetoresistive sensor used as the read head in magnetic recording disk drives is a sensor based on the giant magnetoresistance (GMR) effect. A GMR sensor has a stack of layers that includes two ferromagnetic layers separated by a nonmagnetic electrically conductive spacer layer, which is typically copper (Cu). In one type of GMR sensor, called a "spin-valve", one of the ferromagnetic layer has its magnetization direction fixed, such as by being pinned by exchange coupling with an adjacent antiferromagnetic layer, and the other ferromagnetic layer has its magnetization direction "free" to rotate in the presence of an external magnetic field. With a sense current applied to the sensor and in the presence of an applied magnetic field, the rotation of the free-layer magnetization relative to the fixed-layer magnetization is detectable as a change in electrical resistance.

In a magnetic recording disk drive spin-valve read sensor or head, the stack of layers are located in the read "gap" between magnetic shields. The magnetization of the fixed or pinned layer is generally perpendicular to the plane of the disk, and the magnetization of the free layer is generally parallel to the plane of the disk in the absence of an external magnetic field. When exposed to an external magnetic field from the recorded data on the disk, the free-layer magnetization will rotate, causing a change in electrical resistance. If the sense current flowing through the stack is directed parallel to the planes of the layers in the sensor stack, the sensor is referred to as a current-in-the-plane (CIP) sensor, while if the sense current is directed perpendicular to the planes of the layers in the sensor stack, it is referred to as current-perpendicular-to-the-plane (CPP) sensor. A CPP-GMR spin-valve type of read head is described by A. Tanaka et al., "Spin-valve heads in the current-perpendicular-to-plane mode for ultra-high-density recording", *IEEE Transactions on Magnetics*, Vol. 38 (1): 84-88 Part 1, January 2002.

CPP-GMR sensors are susceptible to current-induced noise and instability. The spin-polarized bias or sense current flows perpendicularly through the ferromagnetic layers and produces a spin transfer torque (STT) on the local magnetization. This can produce continuous gyrations of the magnetization, resulting in substantial low-frequency magnetic noise if the bias current is above a certain level. This effect is described by J.-G. Zhu et al., "Spin transfer induced noise in CPP read heads," *IEEE Transactions on Magnetics*, Vol. 40, January 2004, pp. 182-188. To maximize the signal and signal-to-noise ratio (SNR) in CPP-GMR sensors, it is desirable to operate the sensors at a high bias current density. However, the adverse effect of STT limits the bias current at which the sensors can operate. One proposal to alleviate this problem to some degree is to increase the magnetic damping of the ferromagnetic free layer, i.e., to increase the effective thermal coupling between the magnetization (spin-system) and that of its host lattice. The free layer with magnetization gyrations caused by STT will lose energy to the lattice faster than it can absorb energy from the bias current via STT. US 2006/0221512 A1, assigned to the same assignee as this application, describes a CPP-GMR sensor with an antiparallel free layer (AP-free) structure, i.e., two free layers with magnetizations oriented antiparallel across a Ru spacer layer, wherein one of the free layers includes a NiFeTb film for magnetic damping of the other free layer across the Ru spacer layer. However, magnetic damping of the free layer in a CPP-GMR sensor does not address the STT problem associated with the pinned layer. The pinned layer, which is exchange-coupled to an antiferromagnetic layer, is difficult to magnetically damp in the same manner as proposed for the free layer due to the necessity of maintaining high exchange coupling of the magnetic layer(s) to the pinned layer and/or high AP-coupling between the reference and pinned layers if an AP-pinned structure is used.

A type of CPP-GMR sensor has been proposed that does not have a ferromagnetic pinned layer, but instead has dual ferromagnetic sensing or free layers separated by a nonmagnetic spacer layer. In the absence of an applied magnetic field, the magnetization directions or vectors of the two free layers are oriented generally orthogonal to one another with parallel magnetization components in the sensing direction of the magnetic field to be detected and antiparallel components in the orthogonal direction. With a sense current applied perpendicularly to the layers in the sensor stack and in the presence of an applied magnetic field in the sensing direction, the two magnetization vectors change their angle relative to one another, which is detectable as a change in electrical resistance. Because of this type of behavior of the magnetization directions of the two free layers, this type of CPP-GMR sensor will be referred to herein as a "scissoring-type" of CPP-GMR sensor. In a scissoring-type CPP-GMR sensor, there is no need for a ferromagnetic pinned layer and thus no need for an antiferromagnetic pinning layer. However, a single layer of hard magnetic material at the back of the sensor, opposite the air-bearing surface, is used to bias the magnetization directions of the two free layers so that they are roughly orthogonal to one another in the quiescent state, i.e., in the absence of an applied magnetic field. Without the hard bias layer, the magnetization directions of the two free layers would tend to be oriented antiparallel to one another. This tendency to be oriented antiparallel results from strong magnetostatic interaction between the two free layers once they have been patterned to sensor dimensions, but may also be the result of exchange coupling between the free layers through the spacer. The scissoring-type of CPP-GMR sensor is described by Seigler, et al., "Current-perpendicular-to-plane multilayer sensors for magnetic recording", *IEEE Transactions on Magnetics*, Vol. 39(3), May 2003, pp. 1855-1858, and in U.S. Pat. No. 7,035,062 B2. However, a scissoring-type CPP-GMR sensor is still susceptible to STT, which limits the bias current density and thus the sensitivity of the sensor.

In addition to STT-induced instability, a scissoring-type CPP-GMR sensor is susceptible to magnetic instability from a different source. The detected signal field is aligned collinearly with the bias field from the hard bias layer above the sensor, rather than orthogonally as in the case of a conventional CPP-GMR spin-valve type sensor with two hard bias layers on each side. In situations where the signal field is antiparallel to the bias field, the total applied field on the scissoring-type sensor is reduced in magnitude (in particular that originating at track edges), and the sensor is more susceptible to magnetic instability than a spin-valve type sensor where the total applied field on the sensor is never smaller than the hard bias field (which is strongest at the track edges). This generally makes the stabilization of the scissoring-type sensor more difficult compared to a spin-valve sensor.

What is needed is a scissoring-type CPP-GMR sensor that can operate at high bias current densities without magnetic instability.

SUMMARY OF THE INVENTION

The invention relates to a scissoring-type CPP-GMR sensor with magnetically damped free layers. In one embodiment each of the two free layers is in contact with a damping layer that comprises Pt or Pd, or a lanthanoid (an element selected from the group consisting of La, Ce, Pr, Nd, Pm, Sm, Eu, Gd, Tb, Dy, Ho, Er, Th, Yb, and Lu). Each of the two free layers has one of its surfaces in contact with the sensor's electrically conducting nonmagnetic spacer layer and its other surface in contact with its associated damping layer. A nonmagnetic film may be located between each free layer and its associated damping layer. In another embodiment the rare-earth metal is present as a dopant or impurity in each of the two free layers. In another embodiment a nanolayer of the rare-earth metal is located within each of the two free layers.

For a fuller understanding of the nature and advantages of the present invention, reference should be made to the following detailed description taken together with the accompanying figures.

DETAILED DESCRIPTION OF THE INVENTION

Figure 1:
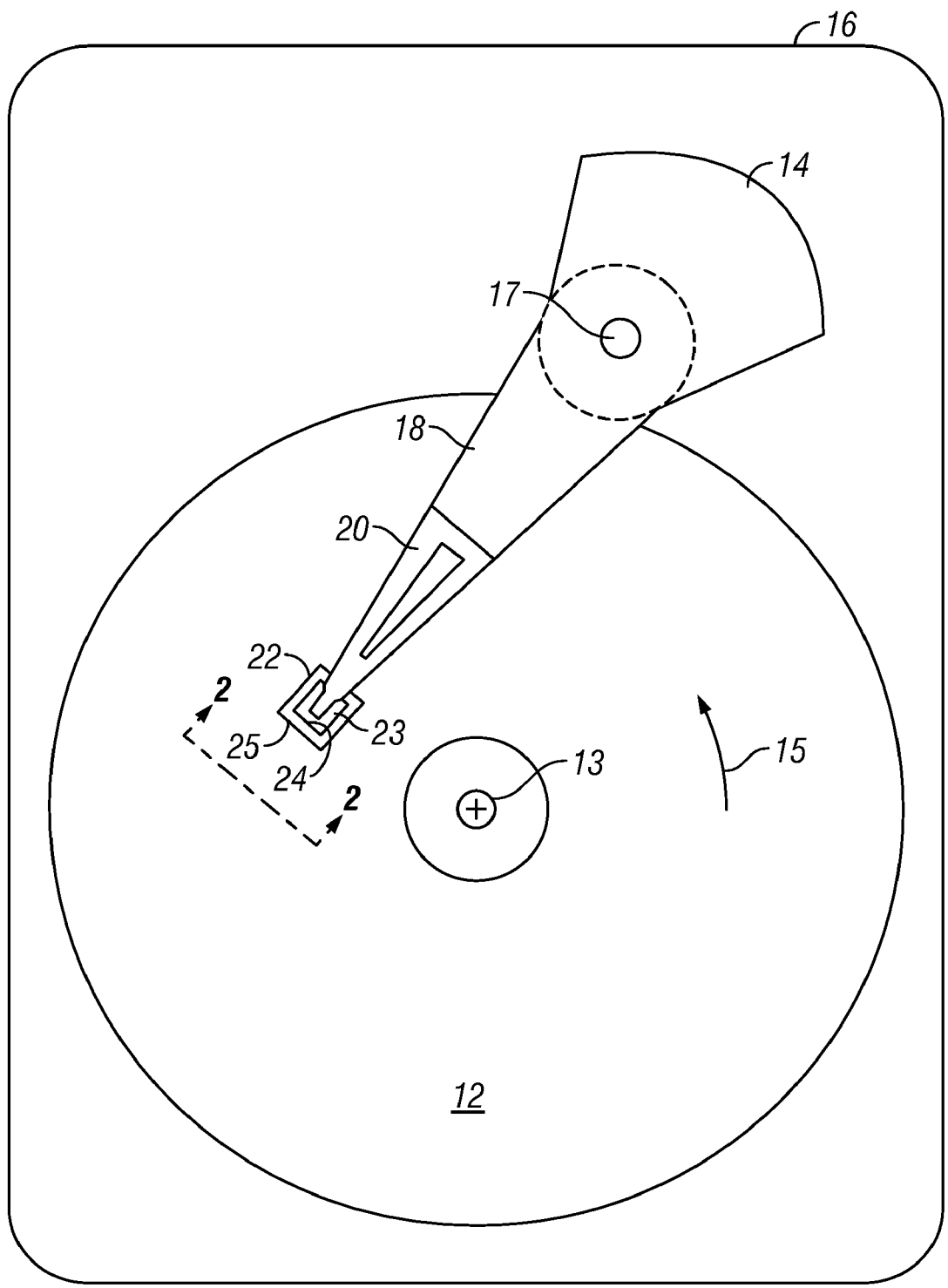
FIG. 1 is a schematic top view of a conventional magnetic recording hard disk drive with the cover removed.

The CPP magnetoresistive (MR) sensor of this invention has application for use in a magnetic recording disk drive, the operation of which will be briefly described with reference to FIGS. 1-3. FIG. 1 is a block diagram of a conventional magnetic recording hard disk drive. The disk drive includes a magnetic recording disk 12 and a rotary voice coil motor (VCM) actuator 14 supported on a disk drive housing or base 16. The disk 12 has a center of rotation 13 and is rotated in direction 15 by a spindle motor (not shown) mounted to base 16. The actuator 14 pivots about axis 17 and includes a rigid actuator arm 18. A generally flexible suspension 20 includes a flexure element 23 and is attached to the end of arm 18. A head carrier or air-bearing slider 22 is attached to the flexure 23. A magnetic recording read/write head 24 is formed on the trailing surface 25 of slider 22. The flexure 23 and suspension 20 enable the slider to "pitch" and "roll" on an air-bearing generated by the rotating disk 12. Typically, there are multiple disks stacked on a hub that is rotated by the spindle motor, with a separate slider and read/write head associated with each disk surface.

Figure 2:
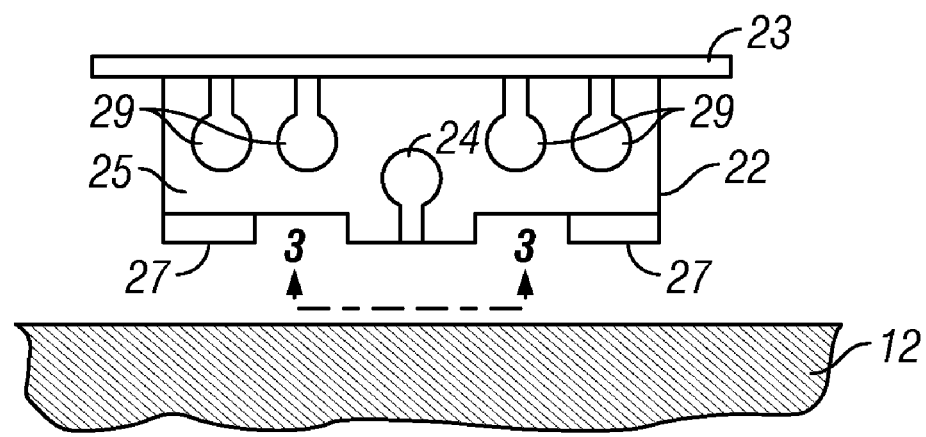
FIG. 2 is an enlarged end view of the slider and a section of the disk taken in the direction 2-2 in FIG. 1.

FIG. 2 is an enlarged end view of the slider 22 and a section of the disk 12 taken in the direction 2-2 in FIG. 1. The slider 22 is attached to flexure 23 and has an air-bearing surface (ABS) 27 facing the disk 12 and a trailing surface 25 generally perpendicular to the ABS. The ABS 27 causes the airflow from the rotating disk 12 to generate a bearing of air that supports the slider 22 in very close proximity to or near contact with the surface of disk 12. The read/write head 24 is formed on the trailing surface 25 and is connected to the disk drive read/write electronics by electrical connection to terminal pads 29 on the trailing surface 25.

Figure 3:
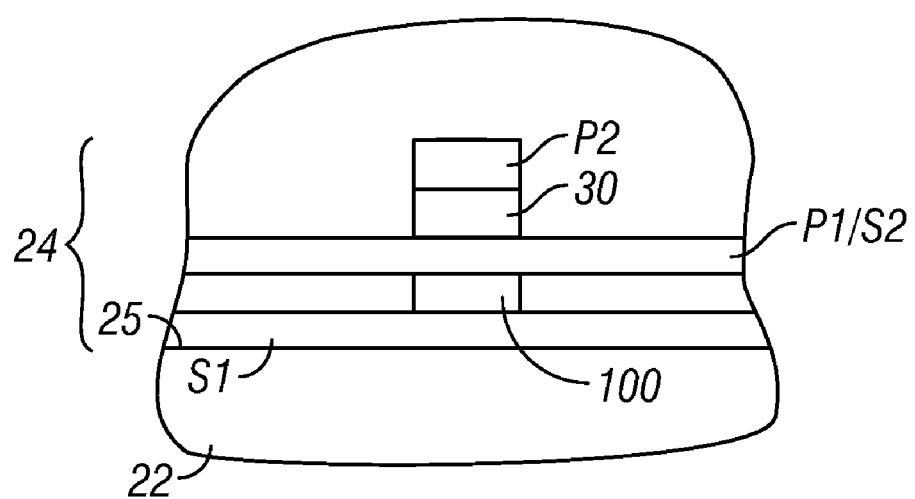
FIG. 3 is a view in the direction 3-3 of FIG. 2 and shows the ends of the read/write head as viewed from the disk.

FIG. 3 is a view in the direction 3-3 of FIG. 2 and shows the ends of read/write head 24 as viewed from the disk 12. The read/write head 24 is a series of thin films deposited and lithographically patterned on the trailing surface 25 of slider 22. The write head includes magnetic write poles P1/S2 and P1 separated by a write gap 30. The CPP MR sensor or read head 100 is located between two magnetic shields S1 and P1/S2, with P1/S2 also serving as the first write pole for the write head. The shields S1, S2 are formed of magnetically permeable material and are electrically conductive so they can function as the electrical leads to the read head 100. Separate electrical leads may also be used, in which case the read head 100 is formed in contact with layers of electrically conducting lead material, such as tantalum, gold, Ru, Rh or copper, that are in contact with the shields S1, S2.

Figure 4A:
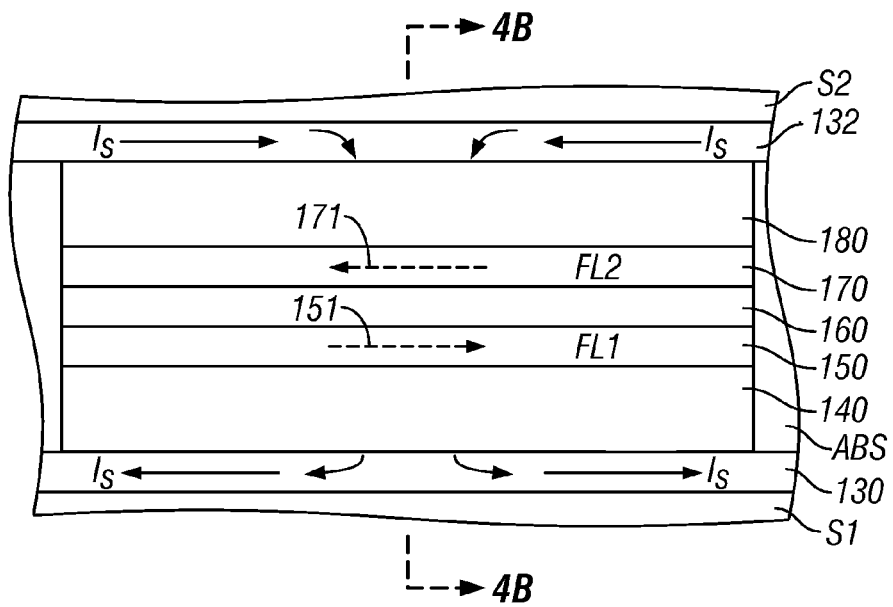
FIG. 4A is a cross-sectional schematic view facing the air-bearing surface (ABS) of a scissoring-mode CPP read head showing the stack of layers located between the magnetic shield layers.

FIG. 4A is an enlarged sectional view of a scissoring-type CPP-GMR sensor 100 and is a view facing the ABS. Sensor 100 is a scissoring-type CPP GMR read head comprising a stack of layers, including dual sensing or free layers, formed between the two magnetic shield layers S1, S2 that are typically electroplated NiFe alloy films. The lower shield S1 is typically polished by chemical-mechanical polishing (CMP) to provide a smooth substrate for the growth of the sensor stack. This may leave an oxide coating which can be removed with a mild etch just prior to sensor deposition. The sensor layers are a first ferromagnetic free or sensing layer (FL1) 150 having a magnetic moment or magnetization direction 151 and a second ferromagnetic free or sensing layer (FL2) 170 having a magnetic moment or magnetization direction 171. The arrows represent projections of the magnetization directions into the ABS plane.

FL1 and FL2 are typically formed of conventional ferromagnetic materials like crystalline CoFe or NiFe alloys, or a multilayer of these materials, such as a CoFe/NiFe bilayer. Instead of these conventional ferromagnetic materials, FL1 and FL2 may be formed of or comprise a ferromagnetic Heusler alloy, some of which are known to exhibit high spin-polarization in their bulk form. Full and half Heusler alloys are intermetallics with particular composition and crystal structure. Examples of Heusler alloys include but are not limited to the full Heusler alloys $Co_2MnX$ (where X is one or more of Al, Sb, Si, Sn, Ga, or Ge), and $Co_2Fe_xCr_{(1-x)}Al$ (where x is between 0 and 1). Examples also include but are not limited to the half Heusler alloys NiMnSb, and PtMnSb. A perfect Heusler alloy with 100% spin-polarization will result in large magnetoresistance when incorporated into a CPP sensor. However it is possible that in a thin-film form and at finite temperatures, the band structure of the Heusler alloy may deviate from its optimal structure and that the spin polarization will decrease. For example, some alloys may exhibit chemical site disorder and crystallize in the B2 structure instead of the $L2_1$ Heusler structure. Nevertheless, a high magnetoresistance can still be obtained as long as the spin polarization exceeds that of conventional ferromagnetic alloys, or if spin-dependent scattering in the Heusler alloy is high. Thus, as used herein a "Heusler alloy" shall mean an alloy with a composition substantially the same as that of a known Heusler alloy, and which results in high magnetoresistance due to enhanced spin polarization and/or enhanced spin-dependent scattering compared to conventional ferromagnetic materials such as NiFe and CoFe alloys.

FL1 and FL2 comprise self-referenced free layers, and hence no pinned or pinning layers are required, unlike in conventional CPP-GMR spin-valve type sensors. FL1 and FL2 have their magnetization directions 151, 171, respectively, oriented in the plane of the film and nonparallel and approximately orthogonal to one another in the absence of an applied magnetic field. While the magnetic moments 151, 171 in the quiescent state (the absence of an applied magnetic field) are oriented approximately orthogonal, i.e., 90 degrees to each other, they may be oriented nonparallel to each other by less or more than 90 degrees, depending on the bias point at which the sensor 100 is operated. FL1 and FL2 are separated by a nonmagnetic spacer layer 160. Spacer layer 160 is a nonmagnetic electrically conductive metal or metal alloy, like Cu, Au, Ag, Ru, Rh, Cr and their alloys. In addition, one or more thin layers "nanolayers" (less than about 10 Å) of other materials such as Cu or Au may be inserted within at least one of FL1 or FL2, in order to increase spin-dependent scattering and thus the sensor magnetoresistance. Typically, these nanolayers are sufficiently thin that all the regions of each of FL1 and FL2 remain ferromagnetically coupled and act as a single magnetic layer under the influence of external magnetic fields.

Located between the lower shield layer S1 and the FL1 are the bottom electrical lead 130 and an underlayer or seed layer 140. The seed layer 140 may be a single layer or multiple layers of different materials. Located between FL2 and the upper shield layer S2 are a capping layer 180 and the top electrical lead 132. The leads 130, 132 are typically Ta or Rh, with lead 130 serving as the substrate for the sensor stack. However, a lower resistance material may also be used. They are optional and used to adjust the shield-to-shield spacing. If the leads 130 and 132 are not present, the bottom and top shields S1 and S2 are used as leads, with S1 then serving as the substrate for the deposition of the sensor stack. The underlayer or seed layer 140 is typically one or more layers of NiFeCr, NiFe, Ta, Cu or Ru. The capping layer 180 provides corrosion protection and is typically formed of single layers, like Ru or Ta, or multiple layers of different materials, such as a Cu/Ru/Ta trilayer.

In the presence of an external magnetic field in the range of interest, i.e., magnetic fields from recorded data on the disk 12, the magnetization directions 151 and 171 of FL1 and FL2, respectively, will rotate in opposite directions. Thus when a bias or sense current $I_S$ is applied from top lead 132 perpendicularly through the stack to bottom lead 130, the magnetic fields from the recorded data on the disk will cause rotation of the magnetizations 151, 171 in opposite directions relative to one another, which is detectable as a change in electrical resistance.

Figure 4B:
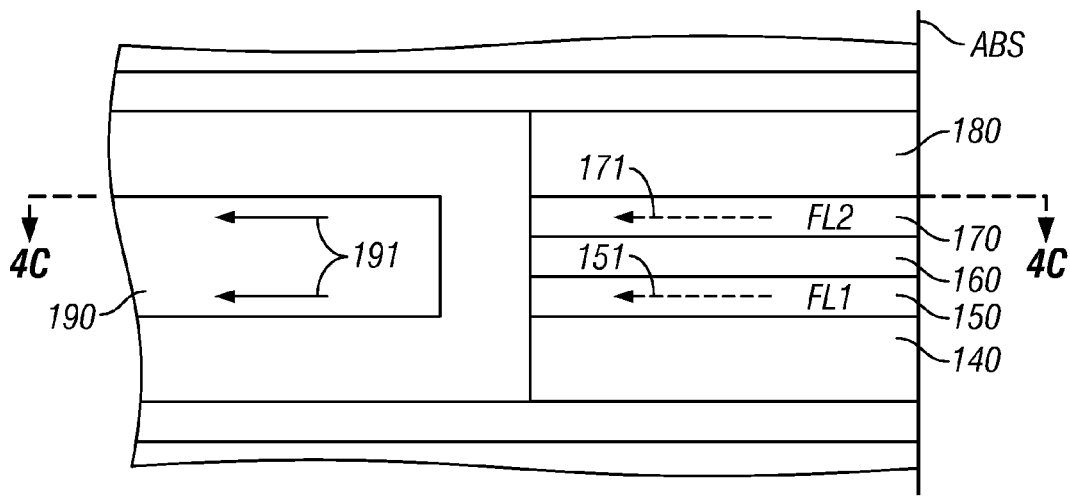
FIG. 4B is a view of section 4B-4B of FIG. 4A and shows the ABS in edge view.
Figure 4C:
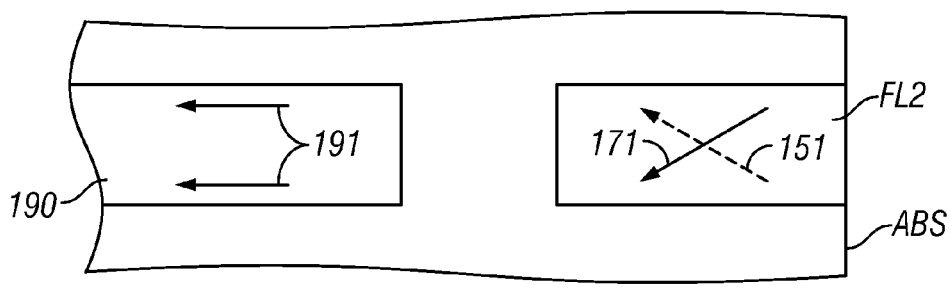
FIG. 4C is a view of section 4C-4C of FIG. 4B and shows the ABS in edge view.

FIG. 4B is a sectional view along the plane 4B-4B in FIG. 4A and shows the ABS as a plane normal to the paper. FIG. 4C is a view along the plane 4C-4C in FIG. 4B and also shows the ABS as a plane normal to the paper. FIG. 4C shows the in-plane generally orthogonal relative orientation of magnetization directions 151, 171, with magnetization direction 151 being depicted as a dashed arrow because it is the magnetization direction of underlying FL1 which is not visible in FIG. 4C. As can be seen from FIG. 4C, in the absence of an applied magnetic field, the magnetization directions or vectors 151, 171 have parallel components in the sensing direction of the magnetic field to be detected (perpendicular to the ABS) and antiparallel components in the orthogonal direction (parallel to the ABS). FIGS. 4B and 4C show a hard bias layer 190 recessed from the ABS. The hard bias layer 190 is a hard magnet magnetized in-plane in the direction 191. Hard bias layer 190 stabilizes or biases the FL1, FL2 magnetization directions 151, 171 in their generally orthogonal relative orientation by rotating them away from what would otherwise be an antiparallel orientation. Hard bias layer 190 may be formed of a CoPt or CoPtCr alloy or other relatively high coercivity ferromagnetic material. Referring to FIG. 4C, in the scissoring-type CPP sensor, the detected signal field is generally perpendicular to the ABS and is aligned generally collinearly with the bias field 191 from the hard bias layer 190. In situations where the signal field is antiparallel to the bias field 191, the total applied field on the sensor (FL1 and FL2) is reduced in magnitude, and thus the sensor can be susceptible to magnetic instability (particular that originating at track edges). Additionally, FL1 and FL2 are susceptible to STT, which requires that the current density of sense current $I_S$ be limited to avoid sensor instability.

Figure 5A:
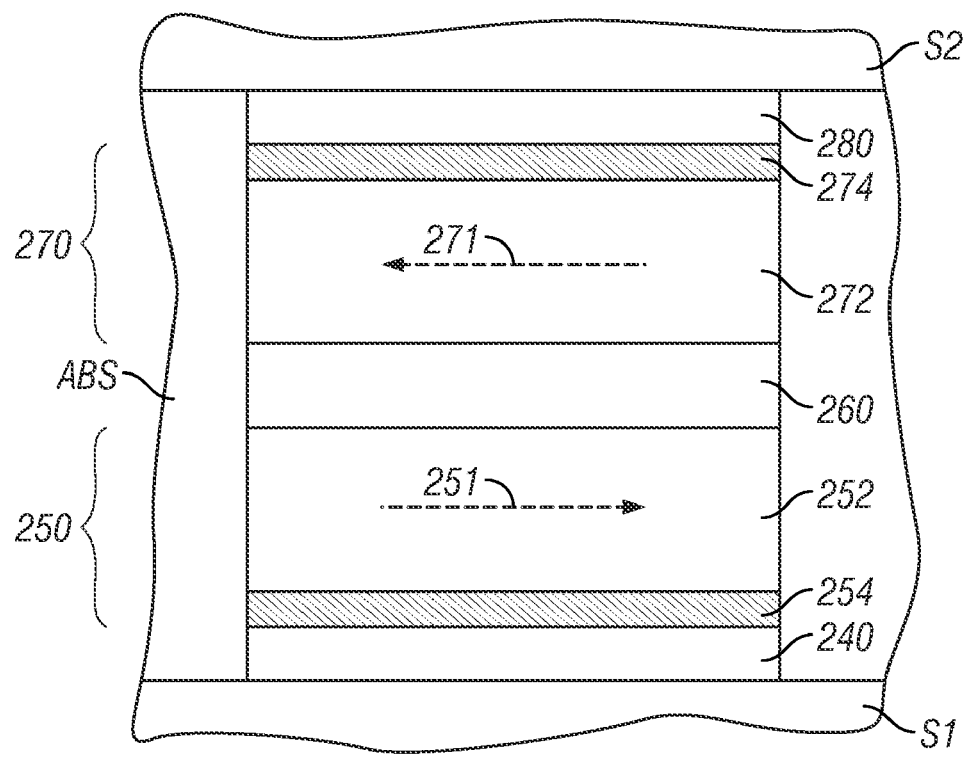
FIG. 5A is a cross-sectional schematic view facing the ABS for the scissoring-type CPP-GMR sensor according to one embodiment of this invention.

FIG. 5A is a cross-sectional schematic view facing the ABS for the scissoring-type CPP-GMR sensor according to one embodiment of this invention, and shows the sensor with the magnetic shields S1, S2 also serving as the electrical leads. The sensor includes an underlayer or seed layer 240 on shield S1, a first sensing structure 250 on seed 240, a second sensing structure 270, an electrically conducting nonmagnetic spacer layer 260 between first and second sensing structures 250, 270, and a capping layer 280 between second sensing structure 270 and upper shield S2. Seed layer 240 and capping layer 280 each has a thickness in the range of about 10 to 70 Å and may be formed of the same material or materials as described for seed layer 140 and capping layer 180, respectively, in FIG. 4A. Spacer layer 260 is preferably copper (Cu)

with a thickness in the range of 15 to 45 Å but may be formed of the same material as described for spacer layer 160 in FIG. 4A.

Sensing structure 250 includes a first ferromagnetic free layer 252 having an in-plane magnetization direction 251 free to rotate in the presence of an applied magnetic field, and a first damping layer 254. First damping layer 254 is formed of a rare earth metal from the 15 lanthanoid (formerly called "lanthanide") elements or of platinum (Pt) or palladium (Pd). The lanthanoids are lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu). Pt and Pd are heavy elements with strong spin-orbit coupling, as described by Tserkovnyak et al., "Enhanced Gilbert Damping in Thin Ferromagnetic Films", *Phys Rev Lett*, Vol. 88, No. 11, 18 Mar. 2002, 117601. First ferromagnetic free layer 252 is in contact with spacer layer 260 and first damping layer 254 is in contact with first free layer 252 and separated from spacer layer 260 by first free layer 252.

Figure 5B:
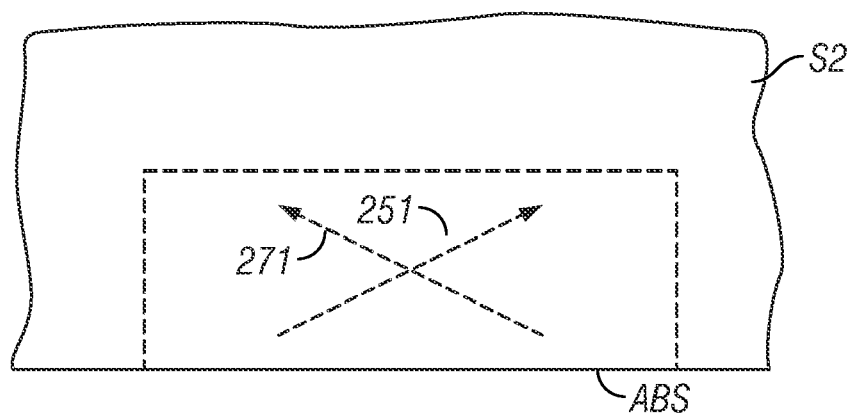
FIG. 5B is a top view from shield S2 of FIG. 5A for the scissoring-type CPP-GMR sensor showing the ABS in edge view and illustrating the orientation of the magnetizations of the first and second free ferromagnetic layers, respectively.

Sensing structure 270 includes a second ferromagnetic free layer 272 having an in-plane magnetization direction 271 free to rotate in the presence of an applied magnetic field, and a second damping layer 274. The orientation of the magnetizations 251, 271 of the first and second free ferromagnetic layers 252, 254, respectively, in the absence of an applied magnetic field, is like the orientation of the magnetizations 151, 171 of the prior art scissoring-type sensor shown in FIGS. 4B and 4C, and is illustrated in FIG. 5B. FIG. 5B is a top view from shield S2 showing the ABS in edge view. Second damping layer 274 is formed of a rare earth metal from the 15 lanthanoid elements or of Pt or Pd. Second ferromagnetic free layer 272 is in contact with spacer layer 260 and second damping layer 274 is in contact with second free layer 272 and separated from spacer layer 260 by second free layer 272.

Each of the first and second ferromagnetic free layers 252, 272 may be formed of the same material or materials as described for free layers 150, 170, respectively in FIG. 4A, with a thickness in the range of about 30 to 80 Å. Each of the first and second damping layers 254, 274 has a thickness in the range of about 1 to 30 Å.

Figure 6:
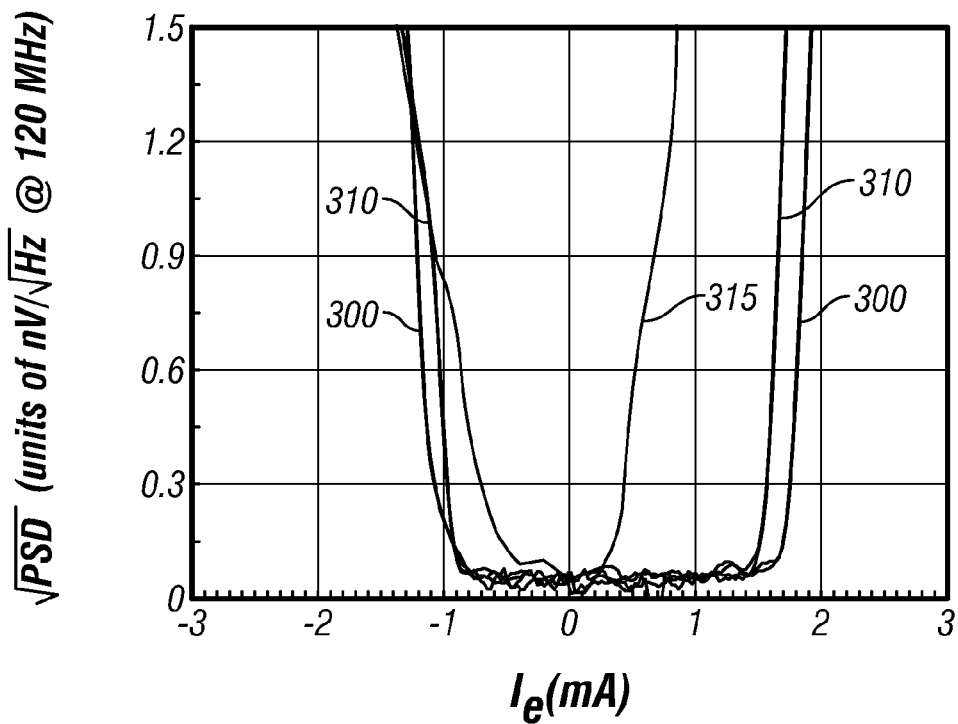
FIG. 6 is a graph of noise power spectral density (PSD) at fixed frequency of 120 MHz, as a function of electron current for applied fields of +4 kOe, 0, and −4 kOe, for a scissoring-type CPP-GMR control sample without a damping layer, wherein the 4 kOe, or 0-field data show spin-torque instability for the parallel, or antiparallel magnetization states, respectively.

FIG. 6 shows the noise power spectral density (PSD) at 120 MHz for a control sample without damping layers 254, 274. The control sample had a sensor stack formed between first and second leads, with the stack comprising first and second free ferromagnetic layers 252, 272 formed of $Co_{50}Fe_{50}$ (where the subscripts refer to atomic percent) with a total thickness of 50 Å and including 2 nanolayers of 4 Å of Cu within each ferromagnetic layer, a seed layer 240 and a capping layer 280 each formed of Ru with a thickness of 110 Å and 10 Å, respectively, and a spacer layer 260 formed of Cu with a thickness of 40 Å. The control sample had a circular surface area with a 55 nm diameter and a resistance of about 15.8Ω. Curves 300 and 310 represents the PSD for large positive and negative applied magnetic field of 4 kOe and −4 kOe, respectively, resulting in each case in a parallel orientation for the two free layer magnetizations. Curve 315 represents the PSD with no applied magnetic field, resulting in a generally antiparallel orientation for the two free layer magnetizations due to their magnetostatic interactions. As expected from STT, it can be seen that the critical current (defined as the current above which the PSD reaches about 0.3 $nV/(Hz)^{1/2}$ is greater for the parallel orientation compared to the antiparallel orientation. Specifically, it can be seen that in the parallel orientation for a "positive" electron current $I_e$ (actual sense current $I_S$ from the top to bottom in FIG. 5A) of greater than a critical current of about 1.7 mA, and for a negative electron current of greater (more negative) than a critical current of about 1.1 mA, there is a rapid increase in noise. In the antiparallel orientation for a "positive" electron current $I_e$ (actual sense current $I_S$ from the top to bottom in FIG. 5A) of greater than a critical current of about 0.4 mA, and for a negative electron current of greater (more negative) than a critical current of about 0.7 mA, there is a rapid increase in noise. For positive electron currents, it is the bottom FL1 (top FL2) which is destabilized in the parallel (antiparallel) state, and visa versa for negative electron currents. Hence, the variation in magnitudes of the critical current with current polarity for the same magnetization orientation is here a reflection of some physical asymmetry between top and bottom FLs which in this particular device results in the bottom FL1 being somewhat more stable than the top FL2. For either current polarity however, the critical current magnitude for antiparallel instability is about 2.5 to 3 times smaller than that for the parallel case. Because during sensor readback the two free layers "scissor" between more-parallel and more-antiparallel orientations, both states are important in determining the effect of STT on the sensor stability. But the lower critical current in the antiparallel case make the behavior in this orientation more critical.

Figure 7:
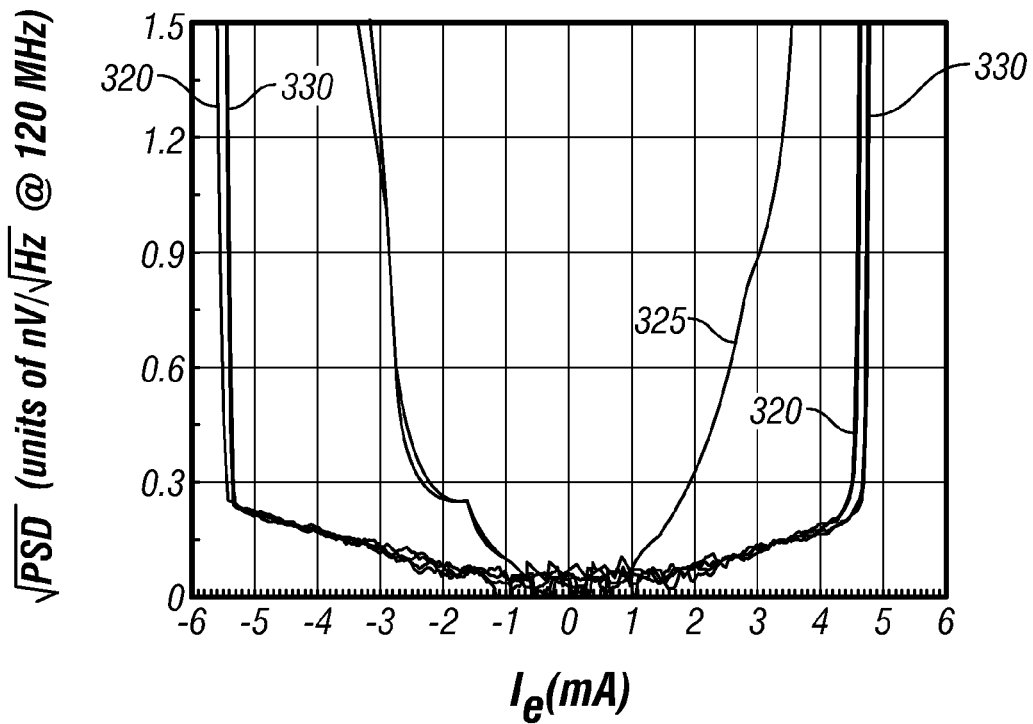
FIG. 7 is a graph of noise power spectral density (PSD) at fixed frequency of 120 MHz, as a function of electron current for applied fields of +4 kOe, 0, and −4 kOe, for a scissoring-type CPP-GMR control sample with damping layers, wherein the 4 kOe, or 0-field data show spin-torque instability for the parallel, or antiparallel magnetization states, respectively.

By comparison, FIG. 7 shows the noise power spectral density (PSD) for a sample with damping layers 254, 274. The sample for FIG. 7 was nominally identical to the control sample, with the exception that it contained damping layers 254, 274, each consisting essentially of Dy with a thickness of about 10 Å. The sample for FIG. 7 also had a circular surface area with a 55 nm diameter but a resistance of about 19.4Ω. Curve 320 represents the PSD for a positive applied magnetic field of −4 kOe and curve 330 represents the PSD for a negative applied magnetic field of −4 kOe, with each field being applied in the plane of magnetization of the free layers, and curve 325 represents the PSD for zero applied magnetic field. As can be seen from FIG. 7, in the parallel orientation, the positive critical current is increased to about 4.5 mA (as compared to about 1.7 mA for the control sample), and the negative critical current is increased (made more negative) to about 5.4 mA (as compared to about 1.1 mA for the control sample). Similarly, in the antiparallel orientation, the positive critical current is increased to about 1.9 mA (as compared to about 0.4 mA for the control sample), and the negative critical current is increased (made more negative) to about 2.3 mA (as compared to about 0.7 mA for the control sample).

Thus the scissoring-type CPP-GMR sensor according to this invention allows a much larger bias or sense current to be applied before current-induced noise occurs. The increase in critical current for current-induced noise by a factor of about three or more can provide a corresponding increase in output voltage for the sensor.

Figure 8:
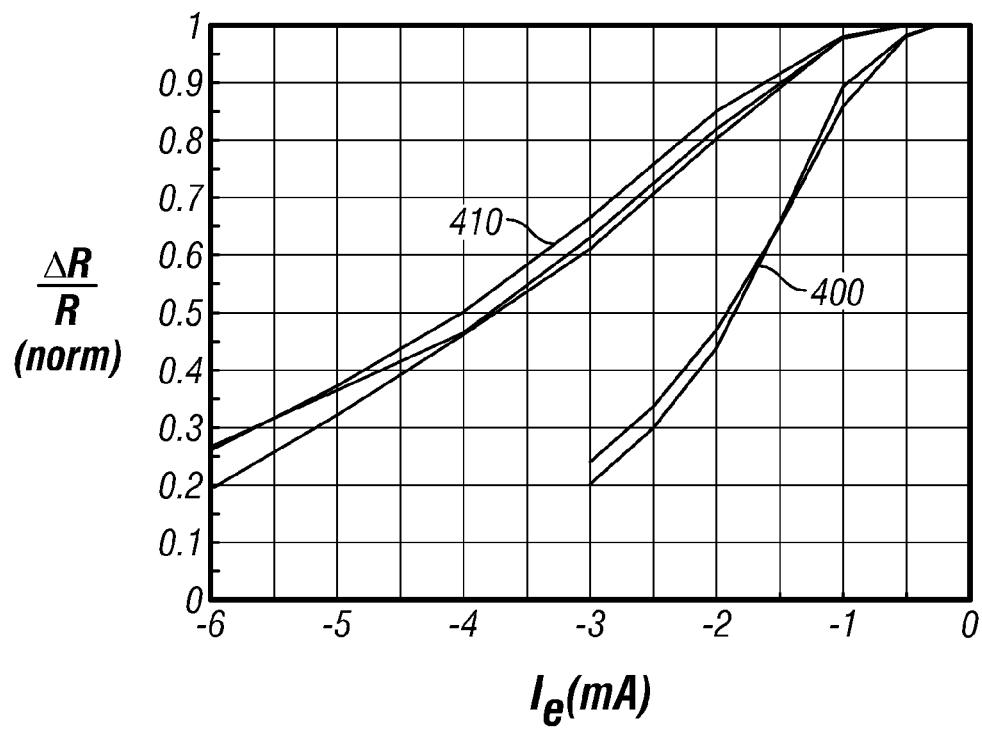
FIG. 8 is a graph of magnetoresistance ($\Delta R/R$) as a function of electron current $I_e$ and illustrates the comparison of the scissoring-type CPP-GMR control sample, whose data is shown in FIG. 6, with the scissoring-type CPP-GMR sample according to the present invention, whose data is shown in FIG. 7.

FIG. 8 shows the comparison of normalized magnetoresistance (ΔR/R) as a function of electron current $I_e$ for the control sample, whose data is shown in FIG. 6, and the sample according to the present invention with Dy damping layers, whose data is shown in FIG. 7. Curves 400 represent the control sample and curves 410 represent the sample according to the present invention. The sample according to the present invention shows a significantly higher magnetoresistance of about 0.65 at an electron current of −3 mA, as compared with about 0.22 for the control sample. The increased values of critical current and magnetoresistance as a result of the use of damping layers adjacent the two free layers are believed to be enhanced in the present invention because, unlike conventional CPP-GMR sensors, there is no ferromagnetic pinned layer which is subjected to STT.

Figure 9:
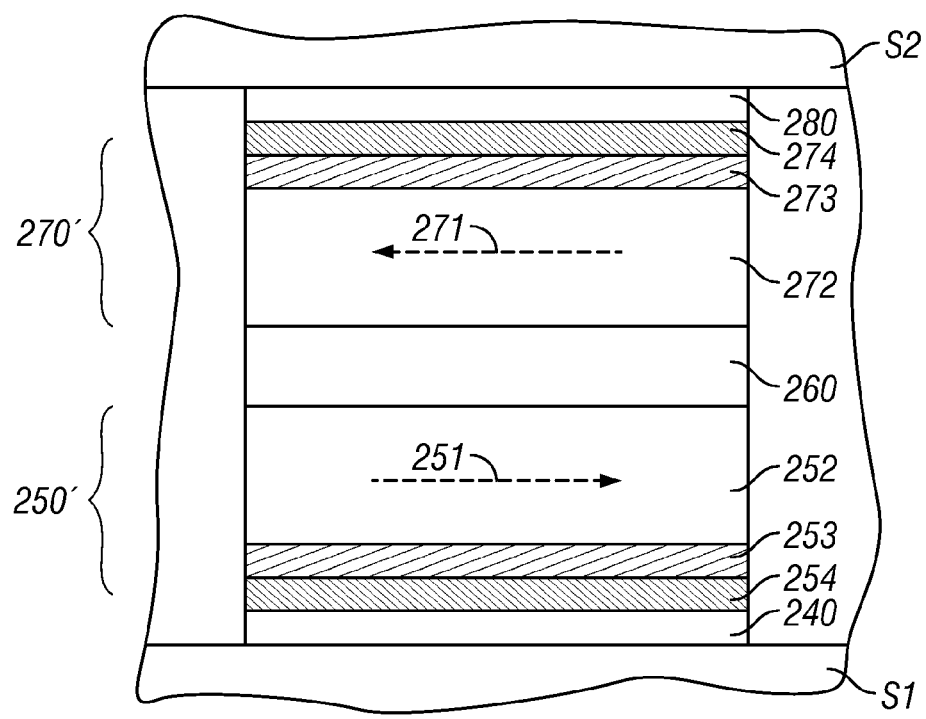
FIG. 9 is a cross-sectional schematic view facing the ABS for the scissoring-type CPP-GMR according to another embodiment of this invention.

It is believed that the effect of STT on the free layers in the scissoring-type CPP-GMR sensor according to the present invention is reduced because the damping layers adjacent the free layers increase the rate of absorption (or loss) of spin energy from the magnetization motion of the free layers to partially cancel the increase in spin energy gained from the spin-polarized bias current. However, the placement of the damping layers in direct contact with the free layers may adversely affect the magnetic properties of the free layers. Thus, in another embodiment of the scissoring-type CPP-GMR sensor according to the present invention, a nonmagnetic film is located between each damping layer and its' associated adjacent free layer. This embodiment is shown in FIG. 9, which is a cross-sectional schematic view facing the ABS. In FIG. 9, the first sensing structure 250' includes a first nonmagnetic film 253 located between and in contact with first free layer 252 and first damping layer 254, and the second sensing structure 270' includes a second nonmagnetic film 273 located between and in contact with second free layer 272 and second damping layer 274. Each of the nonmagnetic films 253, 273 comprises an element selected from the group consisting of Cu, Ru, Au, Ta, Rh, Pd and Pt or an alloy of one or more of these elements. The thickness of each of the nonmagnetic films 253, 273 is in the range of about 5 to 50 Å, which is thin enough (compared to spin-diffusion length of films 253, 273) so that the damping layers continue to absorb spin energy from the motion of the free layer magnetizations.

In another embodiment of the scissoring-type CPP-GMR sensor according to the present invention, the damping element is present in each sensing structure not as a separate damping layer but as a dopant or impurity in the free layer. This embodiment would thus appear like the structure in FIG. 4A, with the exception that each free layer FL1 and FL2 contains the damping element as a dopant or impurity of one or more elements selected from the group consisting of Pt, Pd, and the lanthanoid elements (La, Ce, Pr, Nd, Pm, Sm, Eu, Gd, Tb, Dy, Ho, Er, Th, Yb, and Lu). The amount of the impurity is preferably in the range of about 0.5 to 10 atomic percent of the free layer composition. For example, each of the free layers may have the composition $(CoFe)_{100-y}$—$X_y$, where y is between about 0.5 and 10, and X represents one or more of the selected elements.

In another embodiment of the scissoring-type CPP-GMR sensor according to the present invention, a nanolayer of the damping element (selected from Pt, Pd, and the lanthanoid elements) is located within FL1 and FL2. This embodiment would appear like the structure of FIG. 4A, but with single or multiple layers of the damping element inserted. Depending on the effects of the damping elements on magnetoresistance, these layers may be placed far away from the spacer layer. These nanolayers have a thickness less than about 10 Å, which is sufficiently thin that all the regions of each of FL1 and FL2 remain ferromagnetically coupled and act as a single magnetic layer under the influence of external magnetic fields.

In the previously cited US 2006/0221512 A1 publication only one of the free layers in the antiparallel free layer structure is doped with Tb. However, in the scissoring-type CPP-GMR sensor according to the present invention both free layers are required to be damped, either by a separate rare-earth metal damping layer or by doping the free layer with a rare-earth metal. If the teaching of the US 2006/0221512 A1 publication were relied upon to damp only one of the free layers, the enhanced spin-torque stability would not be achieved for the undamped layer in the case of one of either parallel or antiparallel orientations, regardless of the chosen polarity of the bias current. Furthermore, in US 2006/0221512 A1, the sensor comprises a pinned layer structure in which the pinned/reference layer instability remains the limiting factor in term of STT instability. In the present invention, the damping layers cause an increase in critical current for both parallel and anti-parallel orientation of the sense layers, resulting in a larger overall increase in sensor performance.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetoresistive sensor capable of sensing external magnetic fields when a sense current is applied perpendicular to the planes of the layers in the sensor, the sensor comprising:
   a substrate;
   a first sensing structure on the substrate comprising a first ferromagnetic layer comprising an alloy comprising one or more of Co, Fe and Ni and having an in-plane magnetization direction free to rotate in the presence of an applied magnetic field and a first layer consisting essentially of an element selected from the group consisting of Pt, Pd, La, Ce, Pr, Nd, Pm, Sm, Eu, Gd, Tb, Dy, Ho, Er, Th, Yb, and Lu;
   a nonmagnetic spacer layer on the first ferromagnetic layer; and
   a second sensing structure on the substrate comprising a second ferromagnetic layer comprising an alloy comprising one or more of Co, Fe and Ni on the spacer layer and having an in-plane magnetization direction nonparallel to the first ferromagnetic layer's magnetization direction in the absence of an applied magnetic field and free to rotate in the presence of an applied magnetic field and a second layer consisting essentially of an element selected from the group consisting of Pt, Pd, La, Ce, Pr, Nd, Pm, Sm, Eu, Gd, Tb, Dy, Ho, Er, Th, Yb, and Lu; and
   wherein the first ferromagnetic layer is in contact with the nonmagnetic spacer layer and the second ferromagnetic layer is in contact with the nonmagnetic spacer layer.

2. The sensor of claim 1 wherein in the first sensing structure the first layer of said selected element is in contact with the first ferromagnetic layer, and wherein in the second sensing structure the second layer of said selected element is in contact with the second ferromagnetic layer.

3. The sensor of claim 1 wherein the first sensing structure further comprises a first nonmagnetic film selected from the group consisting of Cu, Ru, Au, Ta, Rh, Pd and Pt and located between and in contact with the first ferromagnetic layer and the first layer of said selected element, and wherein the second sensing structure further comprises a second nonmagnetic film selected from the group consisting of Cu, Ru, Au, Ta, Rh, Pd and Pt and located between and in contact with the second ferromagnetic layer and the second layer of said selected element.

4. The sensor of claim 1 wherein at least one of the first and second ferromagnetic layers comprises a ferromagnetic Heusler alloy selected from the group consisting of $Co_2MnX$ (where X is selected from the group consisting of Al, Sb, Si, Sn, Ga, and Ge), NiMnSb, and $Co_2Fe_xCr_{(1-x)}Al$ (where x is between 0 and 1).

5. The sensor of claim 1 further comprising a hard magnetic biasing layer for biasing the first and second ferromagnetic layers' magnetization directions to be nonparallel.

6. The sensor of claim 1 wherein the sensor is a magnetoresistive read head for reading magnetically recorded data from tracks on a magnetic recording medium, and wherein the substrate is a first shield formed of magnetically permeable material.

7. A scissoring-type current-perpendicular-to-the-plane giant magnetoresistive (CPP-GMR) read head for reading magnetically recorded data from tracks on a magnetic recording medium, the head comprising:
  a first shield layer of magnetically permeable material;
  an underlayer on the first shield;
  a first damping layer on the underlayer and consisting essentially of an element selected from the group consisting of Pt, Pd, La, Ce, Pr, Nd, Pm, Sm, Eu, Gd, Tb, Dy, Ho, Er, Th, Yb, and Lu;
  a first ferromagnetic free layer on the first damping layer and having an in-plane magnetic moment in the absence of an applied magnetic field;
  an electrically conducting nonmagnetic spacer layer on the first ferromagnetic layer;
  a second ferromagnetic free layer on the spacer layer and having an in-plane magnetic moment nonparallel to the first free layer's magnetic moment in the absence of an applied magnetic field, said first and second free layer magnetic moments being free to rotate in opposite directions in the presence of a magnetic field from magnetically recorded data on the medium;
  a second damping layer on the second free layer and consisting essentially of an element selected from the group consisting of Pt, Pd, La, Ce, Pr, Nd, Pm, Sm, Eu, Gd, Tb, Dy, Ho, Er, Th, Yb, and Lu;
  a capping layer on the second damping layer;
  a second shield of magnetically permeable material on the capping layer; and
  a hard magnetic biasing layer for biasing the first and second free layers' magnetic moments to be nonparallel in the absence of an applied magnetic field.

8. The head of claim 7 further comprising a first nonmagnetic film comprising one or more elements selected from the group consisting of Cu, Ru, Au, Ta, Rh, Pd and Pt and located between and in contact with the first damping layer and the first free layer, and a second nonmagnetic film comprising one or more elements selected from the group consisting of Cu, Ru, Au, Ta, Rh, Pd and Pt and located between and in contact with the second free layer and the second damping layer.

9. The head of claim 7 wherein the in-plane magnetic moments of the first and second free layers are generally orthogonal to one another, and wherein the hard magnetic biasing layer biases the first and second free layers' magnetic moments to be generally orthogonal to one another in the absence of an applied magnetic field.

10. The head of claim 7 wherein each of the first and second damping layers consists essentially of Dy.

11. The head of claim 7 wherein at least one of the first and second free layers comprises a ferromagnetic Heusler alloy selected from the group consisting of $Co_2MnX$ (where X is selected from the group consisting of Al, Sb, Si, Sn, Ga, and Ge), NiMnSb, PtMnSb, and $Co_2Fe_xCr_{(1-x)}Al$ (where x is between 0 and 1).

12. A scissoring-type current-perpendicular-to-the-plane giant magnetoresistive (CPP-GMR) sensor capable of sensing external magnetic fields when a sense current is applied perpendicular to the planes of the layers in the sensor, the sensor comprising:
  a substrate;
  a first sensing structure on the substrate comprising a first ferromagnetic layer having an in-plane magnetization direction free to rotate in the presence of an applied magnetic field and a nanolayer having a thickness less than 10 Å and consisting essentially of an element selected from the group consisting of Pt, Pd, La, Ce, Pr, Nd, Pm, Sm, Eu, Gd, Tb, Dy, Ho, Er, Th, Yb, and Lu, the nanolayer being located within the first ferromagnetic layer and between portions of the first ferromagnetic layer, whereby there is no selected nanolayer element in said portions of the first ferromagnetic layer;
  a nonmagnetic spacer layer on the first ferromagnetic layer; and
  a second sensing structure on the substrate comprising a second ferromagnetic layer on the spacer layer and having an in-plane magnetization direction nonparallel to the first ferromagnetic layer's magnetization direction in the absence of an applied magnetic field and free to rotate in the presence of an applied magnetic field and a nanolayer having a thickness less than 10 Å and consisting essentially of an element selected from the group consisting of Pt, Pd, La, Ce, Pr, Nd, Pm, Sm, Eu, Gd, Tb, Dy, Ho, Er, Th, Yb, and Lu, the nanolayer being located within the second ferromagnetic layer and between portions of the second ferromagnetic layer, whereby there is no selected nanolayer element in said portions of the second ferromagnetic layer;
  wherein, in the absence of an external magnetic field, the magnetization directions of the first and second sensing structures have parallel components in the direction of the magnetic field to be sensed and antiparallel components in the direction orthogonal to the direction of the magnetic field to be sensed; and
  wherein, in the presence of an applied magnetic field in the sensing direction, the magnetization directions of the first and second sensing structures change their angle relative to one another.

13. The sensor of claim 12 wherein at least one of the first and second ferromagnetic layers comprises a ferromagnetic Heusler alloy selected from the group consisting of $Co_2MnX$ (where X is selected from the group consisting of Al, Sb, Si, Sn, Ga, and Ge), NiMnSb, PtMnSb, and $Co_2Fe_xCr_{(1-x)}Al$ (where x is between 0 and 1).

14. The sensor of claim 12 further comprising a hard magnetic biasing layer for biasing the first and second ferromagnetic layers' magnetization directions to be nonparallel.

* * * * *